United States Patent [19]

Watanabe et al.

[11] Patent Number: 5,341,235
[45] Date of Patent: Aug. 23, 1994

[54] OPTICAL ISOLATOR AND METHOD FOR PREPARING SAME

[75] Inventors: Toshiaki Watanabe; Toshihiko Ryuo, both of Gunma, Japan

[73] Assignee: Shin-Etsu Chemical Co., Ltd., Tokyo, Japan

[21] Appl. No.: 152,903

[22] Filed: Nov. 15, 1993

Related U.S. Application Data

[63] Continuation of Ser. No. 918,373, Jul. 23, 1992, abandoned, which is a continuation-in-part of Ser. No. 686,422, Apr. 16, 1992, Pat. No. 5,161,049.

[30] Foreign Application Priority Data

| Jul. 24, 1991 | [JP] | Japan | 3-058049 |
| Jul. 24, 1991 | [JP] | Japan | 3-058058 |
| Jul. 24, 1991 | [JP] | Japan | 3-184457 |

[51] Int. Cl.$^5$ .............. G02F 1/09; G02B 27/28
[52] U.S. Cl. .................... 359/281; 359/484; 372/703
[58] Field of Search ............ 359/281, 282, 283, 484; 372/703

[56] References Cited

U.S. PATENT DOCUMENTS

| 3,697,151 | 10/1972 | Skolnick et al. | 359/484 |
| 4,770,505 | 9/1988 | Okazaki | 359/484 |
| 4,804,256 | 2/1989 | Wilson | 359/484 |
| 5,105,307 | 4/1992 | Nishiyama et al. | 359/484 |
| 5,161,049 | 11/1992 | Tanno et al. | 359/484 |

FOREIGN PATENT DOCUMENTS

| 62-148918 | 7/1987 | Japan | 359/484 |
| 1-52119 | 2/1989 | Japan | 372/703 |
| 1-133026 | 5/1989 | Japan | 359/484 |
| 1-133027 | 5/1989 | Japan | 359/484 |
| 2-162319 | 6/1990 | Japan | 372/703 |
| 2-245720 | 10/1990 | Japan | 372/703 |
| 2-272419 | 11/1990 | Japan | 372/703 |
| 4-93814 | 3/1992 | Japan | 372/703 |
| 4-233510 | 8/1992 | Japan | 372/703 |

OTHER PUBLICATIONS

Galvanotechnik, D 7968 Saulgau 67 (1976), Nr. 11, pp. 875–887.

Primary Examiner—Martin Lerner
Attorney, Agent, or Firm—McAulay Fisher Nissen Goldberg & Kiel

[57] ABSTRACT

An optical isolator comprises a polarizer, a Faraday rotator, an analyzer and a magnet for applying a magnetic field to the Faraday rotator wherein the polarizer is incorporated into a first metal cylinder to form a polarizer unit, the Faraday rotator is incorporated into a cylindrical magnet to form a Faraday rotator unit and the analyzer is incorporated into a second metal cylinder to form an analyzer unit, the polarizer, Faraday rotator and analyzer units being arranged within an outer cylinder and the first metal cylinder and the second metal cylinder being joined to the outer cylinder through an adhesive component. The optical isolator can easily be produced, the adhered and supported portion thereof is not peeled off and it has high reliability.

11 Claims, 2 Drawing Sheets

OPTICAL ISOLATOR AND METHOD FOR PREPARING SAME

This is a continuation of application Ser. No. 07/918,373, filed Jul. 23, 1992, now abandoned, which is a continuation-in-part of parent application Ser. No. 07/686,422 filed Apr. 16, 1992, now U.S. Pat. No. 5,161,049 issued Nov. 3, 1992 the contents of which are hereby incorporated by reference.

BACKGROUND OF THE INVENTION

The present invention relates to an optical isolator for preventing the reflection of the light rays emitted from a light source at an end face of an optical system and the returning back of the reflected light rays to the light source as well as a method for preparing the same.

When light rays from a light source are transmitted through an optical system, a part of the light rays is reflected on the end face of the optical system and returned back to the light source. For instance, when an optical signal is transmitted through an optical fiber, the light rays emitted from a laser light source are projected on the end face of the optical fiber, most of the light rays pass through the optical fiber as the transmitted light rays, but a part thereof is reflected on the surface of lenses and the end face of the optical fiber, thus returned back to the laser light source and again reflected on the end face of the laser source to thus serve as a source of noises.

An optical isolator is in general employed in order to eliminate such noises. The optical isolator in general comprises a first polarizer, a Faraday rotator and a second polarizer which are arranged in this order. The Faraday rotator is accommodated in a hollow cylindrical magnet. These parts are in general assembled with the aid of an adhesive.

However, an optical isolator which is assembled with the aid of an adhesive suffers from problems in that it may cause out gassing due to the rise in the environmental temperature and that the optical axis thereof is deflected due to the expansion of the adhesive and, therefore, the optical properties thereof are unstable. Moreover, it takes a long time period for hardening the adhesive during preparing the same and correspondingly the production efficiency is low.

It has been tried to solve these problems by assembling the optical isolator with the aid of a solder material. For instance, Japanese Patent Provisional Publication No. 1-200223 discloses an optical isolator which is prepared by forming a metal film capable of being soldered on the portion of each part through which the parts are assembled and then bonded and integrated into an assembly through soldering. According to this patent, gold plating is applied onto the surface portion of each part, i.e., the first polarizer, the Faraday rotator or the second polarizer other than the optical face thereof and they are bonded to one another through the plated areas by soldering.

Such a connection of these parts through soldering is more stable than that obtained with the aid of an adhesive and can provide optical isolators having stable properties over a long time period, but the adhesion between the gold plating layer and each part is very low and accordingly, the plating layer is often peeled off after the plating or soldering operation. In particular, a glassy layer such as an anti-reflection coating is often applied onto the surface of the parts such as the polarizer and the Faraday rotator and, in this case, the gold plating layer is easily peeled off. In addition, the production cost thereof increases since complicated processes such as plating process are required. Further, light transmittance of forward direction of an optical isolator is deteriorated by dirts on optical surfaces of parts adhering under the processes of the gold plating.

To solve the foregoing problems, the inventors of this invention developed an invention relating to an optical isolator in which a low melting point glass is used for assembling parts such as a polarizer and a Faraday rotator.

During the examination of the parent application Ser. No. 07/686,422, U.S. Pat. No. 4,770,505 was cited which discloses an optical isolator which has close connection with the present invention.

SUMMARY OF THE INVENTION

An object of the present invention is to provide an optical isolator in which a first polarizer, a Faraday rotator and a second polarizer are held on a support member and these optical parts are accommodated within a cylindrical magnet and fixed thereto together with the support member, which can easily be produced, whose adhered and supported portion is not peeled off and which has high reliability and to provide a method for preparing the same.

According to an aspect of the present invention, there is provided an optical isolator which comprises a polarizer, a Faraday rotator, an analyzer and a magnet for applying a magnetic field to the Faraday rotator wherein the polarizer is incorporated into a first metal inner cylinder to form a polarizer unit, the Faraday rotator is incorporated into a cylindrical magnet to form a Faraday rotator unit and the analyzer is incorporated into a second metal inner cylinder to form an analyzer unit, the polarizer, Faraday rotator and analyzer units being arranged in an outer cylinder and the first metal cylinder and the second metal cylinder being joined to the outer cylinder through an adhesive component.

According to another aspect of the present invention, there is provided a method for preparing an optical isolator which comprises the steps of arranging a first metal cylinder in which a polarizer is incorporated, a cylindrical magnet in which a Faraday rotator is incorporated and a second metal cylinder in which an analyzer is incorporated within an outer cylinder in this order; inserting solder pellets in the inter facial regions between the outer cylinder and the first metal cylinder and between the outer cylinder and the second metal cylinder; irradiating the solder pellets with light rays to melt them; and solidifying the molten solder to join the outer cylinder to the first and second metal cylinders and to thus fix the polarizer, the Faraday rotator and the analyzer to each corresponding predetermined position within the outer cylinder.

DETAILED EXPLANATION OF THE INVENTION

Typical embodiments of the present invention will be detailed below with reference to the accompanying drawings.

Figure 1:
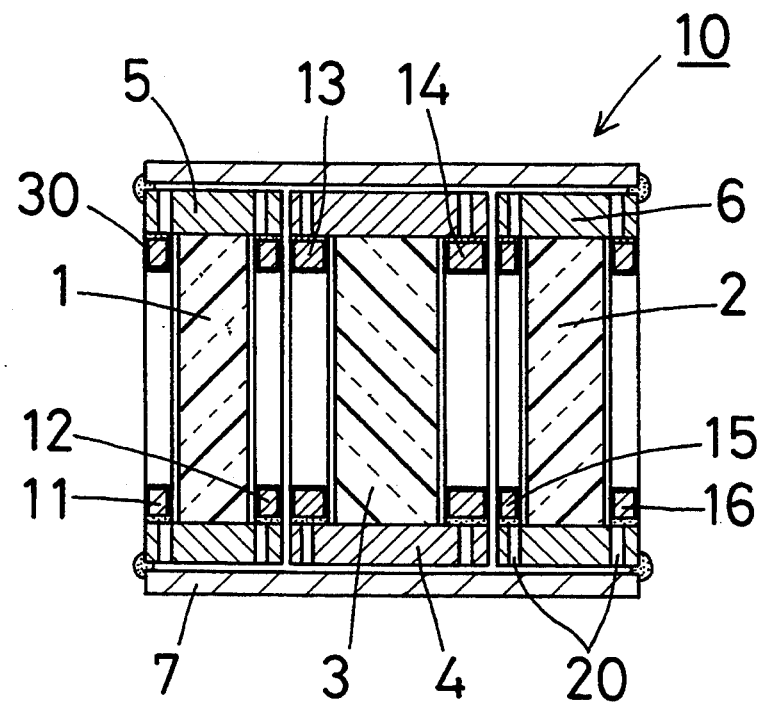
FIG. 1 is a cross sectional view entirely showing an embodiment of the optical isolator according to the present invention.

An optical isolator 10 shown in FIG. 1 comprises a polarizer 1, a Faraday rotator 3, an analyzer 2, a cylindrical magnet 4 for applying a magnetic field to the Faraday rotator 3, metal inner cylinders 5 and 6, and metal ring members 11, 12, 13, 14, 15 and 16 which are arranged within an outer cylinder 7 for assembling and united by joining with a solder. The metal inner cylinders 5 and 6 and the cylindrical magnet 4 each is provided with holes 20 for introducing a solder.

The polarizer 1 is formed from a polarizing glass plate in the form of a cylinder having an outer diameter such that the cylinder can be put in the metal inner cylinder 5, while the analyzer 2 is formed from a polarizing glass plate in the form of a cylinder having an outer diameter such that the cylinder can be put in the metal inner cylinder 6. The Faraday rotator 3 is formed from a bismuth-substituted rare-earth iron garnet crystal in the form of a cylinder capable of being fitted in the cylindrical magnet 4. All of the metal inner cylinders 5 and 6 and the metal ring members 11, 12, 13, 14, 15 and 16 are formed from a metallic material selected from stainless steel, brass, and tin, silver, gold, palladium, copper and alloys mainly comprising these metals which are solderable. When metal ring members are difficult to solder, surfaces thereof metal thin films may be formed on gold pre-plating to the members. Other metals, tin, silver, palladium or copper can be used. Methods other than plating may be used for forming the metal thin film such as vacuum evaporation or spattering. The metal inner cylinder 5 (or the metal inner cylinder 6) is formed such that it has an outer diameter identical to that of the cylindrical magnet 4 and a width equal to the sum of the widths of the polarizer 1 (or analyzer 2) and the metal ring members 11, 12 (or the metal ring members 15 and 16).

In case that metal ring members are made from silver, it is preferable to form black silver sulfide film by sulfurating the surface of the silver.

A black metal thin film 30 mainly comprising silver sulfide is applied onto the inner surface and side face of each metal ring member 11, 12, 13, 14, 15 or 16. The metal thin film 30 can be formed as follows. Each metal ring member is allowed to stand in a gas comprising hydrogen sulfide for 3 to 10 minutes after coating, with a wax or a heat-resistant resin, the portions thereof at which the member is subsequently soldered. Then the wax or the heat-resistant resin is removed using a solvent to give a metal part with a black film formed on desired areas.

The width of the cylindrical magnet 4 is equal to the sum of the widths of the Faraday rotator 3 and the metal ring members 13 and 14. In addition, the width of the outer cylinder 7 is designed so as to have a width equal to the sum of the widths of the metal inner cylinder 5, the cylindrical magnet 4 and the metal inner cylinder 6. The metal inner cylinders 5 and 6 and the cylindrical magnet 4 each has 6 holes positioned at both ends symmetrically with respect to the radial direction and perpendicularly to the optical axis. A solder which comprises tin, lead and/or silver is packed in each hole 20.

The polarizer 1 (or the analyzer 2) is arranged in the metal inner cylinder 5 (or the metal inner cylinder 6) and sandwiched and fixed between the metal ring members 11 and 12 (or the metal ring members 15 and 16). The Faraday rotator 3 is positioned in the cylindrical magnet 4 and sandwiched and fixed between the metal ring members 13 and 14. Then the solder packed in each hole 20 is molten to thus fill the interstices between the metal inner cylinder 5, the metal ring members 11 and 12 and the polarizer 1, between the metal inner cylinder 6, the metal ring members 15 and 16 and the analyzer 2 and between the cylindrical magnet 4, metal ring members 13 and 14 and the Faraday rotator 3.

Thus, a polarizer unit wherein the polarizer 1 is incorporated into the metal inner cylinder 5, a Faraday rotator unit wherein the Faraday rotator 3 is incorporated into the cylindrical magnet 4 and an analyzer unit wherein the analyzer 2 is incorporated into the metal inner cylinder 6 are arranged, in this order, at desired positions within the outer cylinder 7 and the metal inner cylinders 5 and 6 are to the outer cylinder 7 through soldering to thus complete an optical isolator 10.

When the diameter $\phi$ of a light beam capable of being incident upon this optical isolator 10 is 1 mm, a polarized light beam having a diameter $\phi$ of 0.5 mm was incident upon the optical isolator 10 from the side of the polarizer 1. The insertion loss of the incident light observed was 0.4 dB. On the other hand, when polarized light rays were incident upon the isolator 10 from the opposite direction, i.e., from the side of the analyzer 2, the backward loss of the incident light observed was 38 dB.

Moreover, the optical axis of incident light was shifted by 0.3 mm towards the outer periphery and a polarized light beam having a diameter $\phi$ of 0.5 mm was incident upon the optical isolator 10 from the side of the polarizer 1. At this stage, the intensity of the light rays reflected by the metal parts was not more than 0.05% on the basis of the intensity of the incident light, while when the light was incident upon the isolator from the opposite direction, i.e., from the side of the analyzer 2, the backward loss of the incident light was 38 dB. This clearly indicates that a shift of the optical axis does not cause any change in the characteristics of the optical isolator.

As another embodiment, a metal thin film of black NiP (nickel-phosophor) was applied onto the same portions of the silver sulfide through the electroless plating to give an optical isolator which allows for a light beam having a diameter $\phi$ of 1.2 mm to pass therethrough. The insertion loss of the incident light intensity was 0.3 dB when a polarized light of $\phi$ 0.5 mm was incident upon the isolator at the center thereof from the side of the polarizer 1. On the other hand, when the polarized light rays were incident upon the isolator from the opposite direction, i.e., from the side of the analyzer 2, the backward loss of the light was 42 dB. In addition, the optical axis of incident light was shifted by 0.5 mm from the beam center of the polarizer 1 towards the outer periphery and a polarized light beam having a diameter $\phi$ of 0.5 mm was incident upon the optical isolator. At this stage, the intensity of the light rays reflected by the metal parts was not more than 0.05% on the basis of the intensity of the incident light, while when the light was incident upon the isolator from the opposite direction, i.e., from the side of the analyzer 2, the backward loss of the light was 42 dB. This clearly indicates that a shift of the optical axis does not cause any change in the characteristics of the optical isolator.

A light beam from a laser diode as a light source was incident upon the optical isolator disclosed in Japanese Patent Provisional Publication No. 1-200223 to perform the same measurement carried out above, by way of comparison. This optical isolator was produced by arranging a polarizer and an analyzer in a cylindrical metal part, forming solderable metal films on all of the portions of the parts to be joined and joining these parts through soldering with a tin-lead solder, the resulting isolator allowing for a light beam having a diameter $\phi$ of 1 mm to pass therethrough. When a polarized light beam having a diameter $\phi$ of 0.5 mm was incident upon the optical isolator at the center of the polarizer, the insertion loss in the incident light intensity was 0.5 dB, while when it was incident upon the isolator from the opposite side, i.e., from the side of the analyzer was 35 dB. On the other hand, when the optical axis of the incident light was shifted by 0.3 mm from the beam center of the polarizer towards the outer periphery, about 1% of the incident light was reflected back to the light source through reflection by the metal parts, while when the light beam was incident upon the isolator from the opposite side, i.e., from the side of the analyzer, the backward loss in the light intensity was 28 dB. This clearly indicates that a shift of the optical axis causes a change in the characteristics of the optical isolator.

Figure 2:
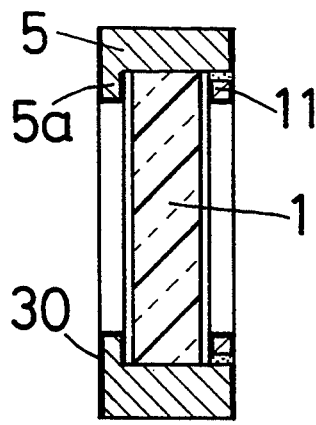
FIG. 2 is a cross sectional view illustrating a part of an embodiment of the polarizer unit according to the present invention.

The polarizer unit in which the polarizer 1 is incorporated may likewise be produced in a structure as shown in FIG. 2. The polarizer 1 is taken as an example in FIG. 2, but the analyzer 2 can be produced in the same manner. A flange 5a is formed on one side of the metal inner cylinder 5, the polarizer 1 is positioned inside the metal inner cylinder 5 while pressing it against the flange 5a, the metal ring member 11 is fitted in the cylinder 5 on the opposite side and the cylinder 5 and the ring member 11 are joined through soldering. The metal inner cylinder 5 is provided with black thin films 30 on the side face perpendicular to the optical axis and the inner face exposed on the side of the optical path and parallel to the optical axis. Black thin films 30 are also applied onto the inner face and the side face of the metal ring member 11.

Figure 3:
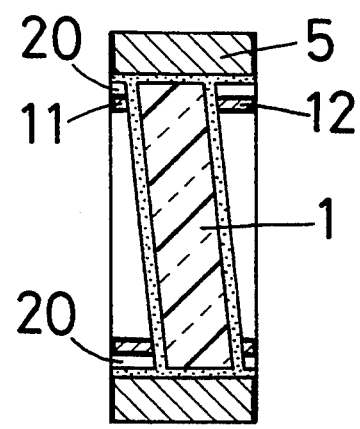
FIG. 3 is a cross sectional view illustrating a part of another embodiment of the polarizer unit according to the present invention.
Figure 4:
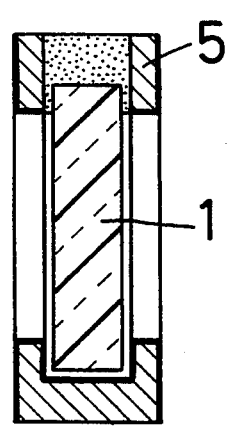
FIG. 4 is a cross sectional view illustrating a part of a still another embodiment of the polarizer unit according to the present invention.

Further, the analyzer unit in which the 10 analyzer 2 is incorporated and the polarizer unit in which the polarizer 1 is incorporated may be formed so as to have structures as shown in FIGS. 3 and 4. In the isolator shown in FIG. 3 wherein the polarizer 1 is inclined, the polarizer 1 is positioned within the metal inner cylinder 5 and fixed thereto by sandwiching it between the metal ring members 11 and 12 formed with a desired inclination. In an embodiment as shown in FIG. 4 wherein the inner diameter of the metal inner cylinder 5 is smaller than the outer diameter of the polarizer 1, the side wall of the inner cylinder 5 is cut to form a space, the polarizer 1 is fitted in the space and the remaining space is filled with a solder to fix the polarizer 1.

In the embodiments shown in FIGS. 1 to 4, all the parts are joined together through a solder, but they can be joined with an organic adhesive in place of a solder. Examples of organic adhesives usable in the invention include epoxy adhesives, silicone adhesives and epoxy-modified silicone adhesives.

Figure 5:
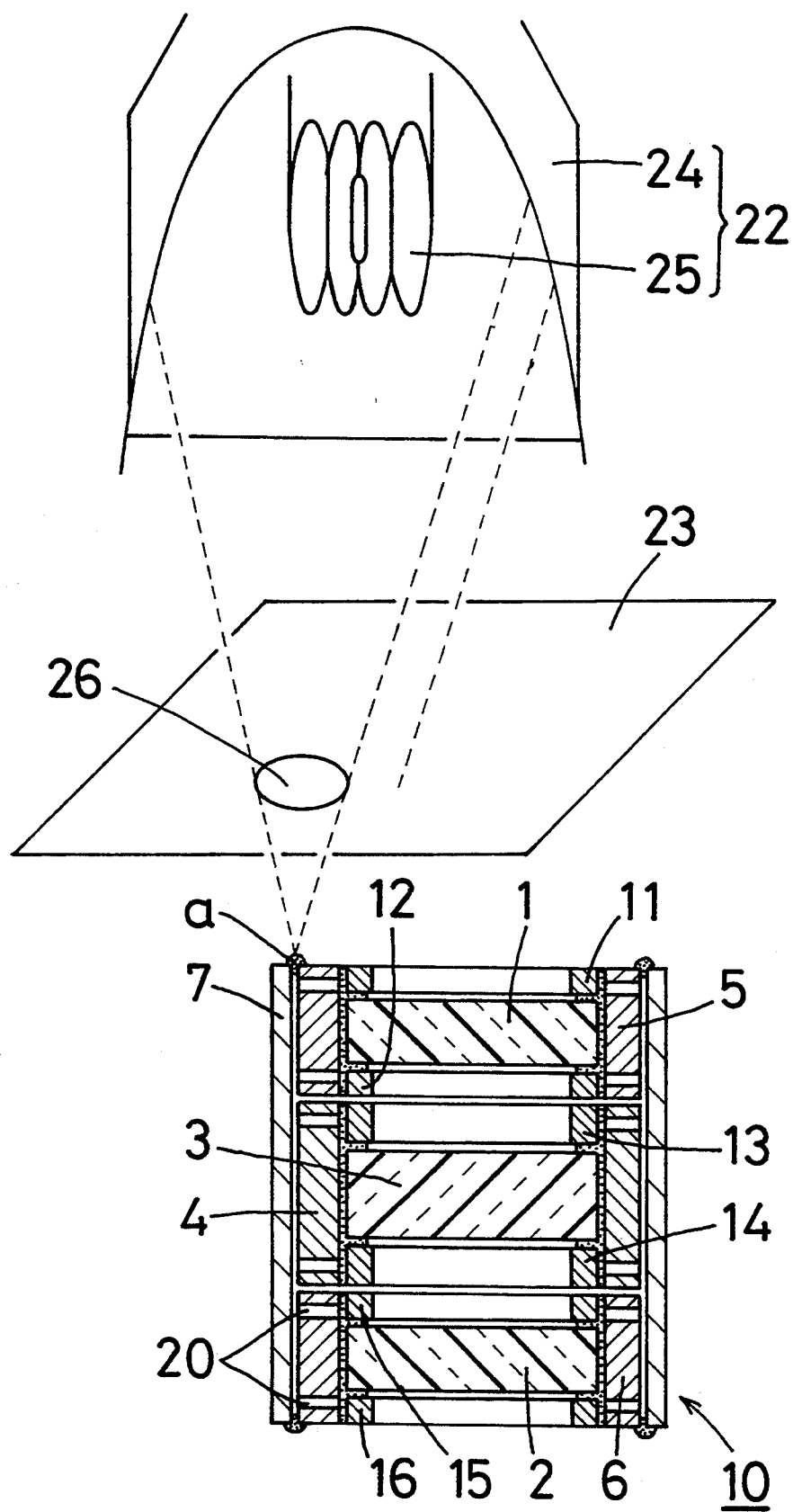
FIG. 5 is a diagram which shows principal parts of an embodiment of the optical isolator and it is given for explaining the method for preparing the isolator according to the present invention.

FIG. 5 is given for explaining an example of the method for the preparation of the isolator 10.

As has been discussed above, a polarizer 1 is incorporated into a metal inner cylinder 5 to give a polarizer unit, a Faraday rotator 3 is incorporated into a cylindrical magnet 4 to give a Faraday rotator unit and an analyzer 2 is incorporated into a metal inner cylinder 6 to give an analyzer unit. The polarizer, Faraday rotator and analyzer units are, in this order, arranged in an outer cylinder 7 and solder pellets are introduced into the inter facial regions between the outer cylinder 7 and the metal inner cylinder 5 and between the outer cylinder 7 and the metal inner cylinder 6. The interfacial region is, for instance, the portion denoted by "a" in FIG. 5. The assembled optical isolator 10 held on a support (not shown) is placed under a light source 22 with a condenser and a mask 23 having a small hole 26 positioned between the light source 22 and the optical isolator 10. The light source 22 comprises a 150 W halogen lamp 25 and a concave mirror 24 of a glass on which aluminum is vapor-deposited. The distance between the halogen lamp 25 and the optical isolator 10 is 50 mm.

The halogen lamp is lighted up, the mask 23 is moved so as to overlap the small hole 26 with the portion "a" to be joined and the emitted light is applied onto the portion "a" for 5 seconds. At this stage, the beam diameter $\phi$ of the light is not more than 3 mm. The solder pellets are molten by the application of light and the molten solder is cooled and hardened after switching off the halogen lamp. Thus, the metal part 5 is joined to the outer cylinder 7. Then the mask 23 is moved to overlap the small hole 26 with another portion to be joined to apply light to the portion. As a result, the solder pellets are molten and then hardened to join the corresponding metal part to the outer cylinder. All of the other portions to be joined are treated in the same manner to complete an optical isolator 10.

If the light from the light source 22 with a condenser is applied to the portions to be joined to molten the solder, the connection can be achieved within a short time period and thus other portions to be joined are not molten except for the corresponding specific portion irradiated. Moreover, the light is focused only upon the portion to be joined and, therefore, the polarized planes of the polarizer and the analyzer are not damaged by heat. In this respect, the light source 22 is designed such that the concave mirror 24 comprises a part of a spheroid, that the halogen lamp 25 is positioned at the first focal point of the spheroid and that the portion "a" to be joined is positioned at the second focal point thereof. Thus, the energy efficiency of the light source is substantially improved. The time required for applying the light from the light source 22 with a condenser to the portion to be joined is determined by the heat capacity of the portion. If a 150 W halogen lamp 25 is used as in this embodiment, it preferably ranges from 1 to 10 seconds. Moreover, if the polarizer and analyzer are formed from a material whose transmittance is deteriorated through irradiation with ultraviolet rays such as a rutile crystal and used for the production of an optical isolator, it is recommendable that UV-shielding filter (for instance, L-42 available from HOYA Corporation) be positioned between the light source 22 with a condenser and the optical isolator 10.

What is claimed is:

1. An optical isolator comprising a polarizer, a Faraday rotator, an analyzer and a magnet for applying a magnetic field to the Faraday rotator, said polarizer, rotator, analyzer and magnet being mutually immobile, wherein the polarizer is inserted between two ring members which are incorporated into a first metal cylinder to form a polarizer unit, the Faraday rotator, formed from a bismuth-substituted rare-earth iron garnet crystal is inserted between two ring members which are incorporated into a cylindrical magnet to form a Faraday rotator unit and the analyzer is inserted between two ring members which are incorporated into a second metal cylinder to form an analyzer unit, said polarizer, Faraday rotator and analyzer units being arranged in an outer cylinder and said first metal cylinder and said second metal cylinder being joined to the outer cylinder through an adhesive component.

2. The optical isolator of claim 1 wherein the adhesive component is a solder and the ring members are made from a solderable metal selected from a group consisting of gold, silver, palladium, tin, copper and alloys mainly comprising these metals.

3. The optical isolator of claim 1 wherein the adhesive component is a solder and the ring members are formed from a material having a solderable metal thin film selected from consisting of gold, silver, palladium, tin, and copper.

4. The optical isolator of claim 1 wherein the adhesive component is an organic adhesive selected from the group consisting of epoxy adhesives, silicone adhesives and epoxy-modified silicone adhesives.

5. An optical isolator comprising a polarizer, a Faraday rotator, an analyzer and a magnet for applying a magnetic field to the Faraday rotator, said polarizer, rotator, analyzer and magnet being mutually immobile, wherein the polarizer is inserted between two ring members which are incorporated into a first metal cylinder to form a polarizer unit, the Faraday rotator is inserted between two ring members which are incorporated into a cylindrical magnet to form a Faraday rotator unit and the analyzer is inserted between two ring members which are incorporated into a second metal cylinder to form an analyzer unit, said polarizer, Faraday rotator and analyzer units being arranged in an outer cylinder and said first metal cylinder and said second metal cylinder being joined to the outer cylinder through an adhesive component, and wherein the adhesive component is a solder and portions of the ring members being exposed to light are black colored.

6. The optical isolator of claim 5 wherein the black portions is formed from nickel-phosphor.

7. An optical isolator comprising a polarizer, a Faraday rotator, an analyzer and a magnet for applying a magnetic field to the Faraday rotator, said polarizer, rotator, analyzer and magnet being mutually immobile, wherein the polarizer is inserted between two ring members which are incorporated into a first metal cylinder to form a polarizer unit, the Faraday rotator is inserted between two ring members which are incorporated into a cylindrical magnet to form a Faraday rotator unit and the analyzer is inserted between two ring members which are incorporated into a second metal cylinder to form an analyzer unit, said polarizer, Faraday rotator and analyzer units being arranged in an outer cylinder and said first metal cylinder and said second metal cylinder being joined to the outer cylinder through an adhesive component, and wherein the adhesive component is a solder, the ring members are made from a silver and portions of the ring members being exposed to light are formed from black silver sulfide on the silver.

8. A method for preparing an optical isolator comprising the steps of arranging a first metal cylinder in which a polarizer is incorporated, a cylindrical magnet in which a Faraday rotator is incorporated and a second metal cylinder in which an analyzer is incorporated in an outer cylinder in this order; inserting solder pellets in the inter facial regions between the outer cylinder and the first metal cylinder and between the outer cylinder and the second metal cylinder; irradiating the solder pellets with light rays to melt the pellets; and solidifying the molten solder to join the outer cylinder to the first and second metal cylinders and to thus fix the polarizer, the Faraday rotator and the analyzer to corresponding predetermined positions within the outer cylinder.

9. The method of claim 8 wherein the light source for applying light to the solder pellets is a halogen lamp.

10. The method of claim 9 wherein when the light is applied to the solder pellets, the halogen lamp is positioned at the first focal point of a spheroid serving as a concave mirror and the solder pellets are positioned at the second focal point thereof.

11. The method of claim 8 wherein the polarizer and the analyzer are formed from a rutile crystal and a UV-shielding filter is inserted between the light source and the solder pellets when the light is applied to the solder pellets.

* * * * *